US009735666B2

(12) United States Patent
Shimomugi et al.

(10) Patent No.: US 9,735,666 B2
(45) Date of Patent: Aug. 15, 2017

(54) POWER CONVERSION DEVICE (71) Applicant: Mitsubishi Electric Corporation, Tokyo (JP)

(72) Inventors: Takuya Shimomugi, Tokyo (JP); Kenta Yuasa, Tokyo (JP); Yosuke Shinomoto, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/782,058

(22) PCT Filed: Apr. 12, 2013

(86) PCT No.: PCT/JP2013/061113
§ 371 (c)(1),
(2) Date: Oct. 2, 2015

(87) PCT Pub. No.: WO2014/167727
PCT Pub. Date: Oct. 16, 2014

(65) Prior Publication Data
US 2016/0036317 A1    Feb. 4, 2016

(51) Int. Cl.
*H02M 7/06* (2006.01)
*H02M 1/32* (2007.01)
(Continued)

(52) U.S. Cl.
CPC ............ *H02M 1/32* (2013.01); *H02M 1/4225* (2013.01); *H02M 7/06* (2013.01); *H02M 3/155* (2013.01);
(Continued)

(58) Field of Classification Search
CPC ......... H02M 3/156; H02M 2003/1552; H02M 3/155; H02M 3/145; H02M 3/158;
(Continued)

(56) References Cited

U.S. PATENT DOCUMENTS

2006/0077600 A1* 4/2006 Yasumura ............. H02M 3/337
361/18
2007/0103949 A1    5/2007 Tsuruya
(Continued)

FOREIGN PATENT DOCUMENTS

CN    1906839 A    1/2007
CN    2458814 Y    11/2007
(Continued)

OTHER PUBLICATIONS

International Search Report of the International Searching Authority mailed May 28, 2013 for the corresponding international application No. PCT/JP2013/061113 (and English translation).
(Continued)

*Primary Examiner* — Harry Behm
*Assistant Examiner* — Bryan R Perez
(74) *Attorney, Agent, or Firm* — Posz Law Group, PLC (57) ABSTRACT

A power conversion device located between an AC power source and a load includes: a rectifier circuit unit that rectifies a voltage of the AC power source; a smoothing unit that smooths a DC voltage on the load side of the rectifier circuit unit; a short-circuiting unit that short-circuits the AC power source; a step-up reactor—located on the AC power source side of the short-circuiting unit; at least one of a reactor current detecting unit—that detects the current of the step-up reactor and a bus voltage detecting unit that detects an output voltage of the smoothing unit; a counterflow preventing element that prevents a counterflow of the current from the smoothing unit to the AC power source; a switching control unit that outputs a control signal for the short-circuiting unit; and a switching frequency changing unit that changes a frequency of the control signal using a logic operation.

9 Claims, 10 Drawing Sheets

(51) Int. Cl.
*H02M 1/42* (2007.01)
*H02M 3/155* (2006.01)
*H02M 3/156* (2006.01)

(52) U.S. Cl.
CPC ...... *H02M 3/156* (2013.01); *H02M 2001/322* (2013.01); *Y02B 70/126* (2013.01)

(58) Field of Classification Search
CPC ........ H02M 3/1588; H02M 7/02; H02M 7/06; H02M 7/10; H02M 7/1623; H02M 7/1626; H02M 7/21; H02M 7/219
See application file for complete search history.

(56) References Cited

U.S. PATENT DOCUMENTS

| | | | | |
|---|---|---|---|---|
| 2008/0123373 | A1* | 5/2008 | Roesner | H02M 3/155 363/65 |
| 2009/0016087 | A1 | 1/2009 | Shimizu | |
| 2011/0132899 | A1* | 6/2011 | Shimomugi | H02M 3/1584 219/620 |
| 2012/0075889 | A1 | 3/2012 | Sasaki | |
| 2012/0187929 | A1* | 7/2012 | Ohshita | H02M 3/1584 323/272 |
| 2012/0249091 | A1* | 10/2012 | Chen | H02M 1/4225 323/207 |
| 2013/0077370 | A1* | 3/2013 | Gu | H02M 1/4225 363/126 |
| 2013/0301317 | A1 | 11/2013 | Ishii | |
| 2013/0342139 | A1 | 12/2013 | Shimomugi et al. | |

FOREIGN PATENT DOCUMENTS

| | | |
|---|---|---|
| CN | 102158205 A | 8/2011 |
| EP | 1 679 782 A2 | 7/2006 |
| EP | 2 333 943 A2 | 6/2011 |
| FR | 2 679 079 A1 | 1/1993 |
| GB | 2 258 958 A | 2/1993 |
| JP | H11-341791 A | 12/1999 |
| JP | 2008-086157 A | 4/2008 |
| JP | 2008-220117 A | 9/2008 |
| JP | 2010-074895 A | 4/2010 |
| JP | 2010-193138 A | 9/2010 |
| WO | 2012/101698 A1 | 8/2012 |
| WO | 2012/137258 A1 | 10/2012 |

OTHER PUBLICATIONS

Office Action dated Feb. 3, 2017 issued in corresponding CN patent application No. 201380075559.4 (and partial English translation).
Extended European Search Report mailed Feb. 15, 2017 in the corresponding EP application No. 13881576.6.

* cited by examiner

WHEN SWITCHING ELEMENT IS TURNED ON (b)

WHEN SWITCHING ELEMENT IS TURNED OFF

FIG.14

POWER CONVERSION DEVICE

CROSS REFERENCE TO RELATED APPLICATION

This application is a U.S. national stage application of International Patent Application No. PCT/JP2013/061113 filed on Apr. 12, 2013, the disclosure of which is incorporated herein by reference.

TECHNICAL FIELD

The present invention relates to a power conversion device that converts AC power source into DC power and supplies the DC power to a load.

BACKGROUND

In the related art, as a power conversion device that converts AC power source into DC power and supplies the DC power to a load, a power conversion device is known, for example, which includes a rectifier that full-wave rectifies an input from an AC power source and a chopper circuit having a switching element of which ON and OFF states are switched in response to a PWM signal. In the chopper circuit of the power conversion device, a current waveform is rectified to improve a power factor and to reduce harmonics of an input current by short-circuiting the power source via a reactor by ON-OFF control of the switching element, and an output voltage is stepped up and down by charging and discharging the reactor with energy.

In such a power conversion device, a frequency at which the switching element is turned on and off is in inverse proportion to an inductance value of the reactor. Accordingly, a technique for reducing the inductance value of the reactor at the time of high-frequency switching has been proposed. For example, Patent Literature 1 discloses a "power supply device including first and second input terminals which are supplied with an input voltage, first and second output terminals from which an output voltage is taken, a choke coil of which one end is connected to the first input terminal and the other end is connected to the first output terminal via a diode, a switching element which is connected between a connection point between the other end of the choke coil and the diode and the second output terminal, a capacitor which is connected between a connection point between the diode and the first output terminal and the second output terminal, a comparator that compares a current flowing when the switching element is turned on with a predetermined threshold value, an oscillator, a pulse-width modulation circuit that controls a duty ratio of a pulse signal formed from an output signal of the oscillator so as to stabilize the output voltage, a frequency switching circuit that is supplied with an output signal from the pulse-width modulation circuit and switches the frequency of the output signal based on a comparison signal from the comparator, and a PFC control circuit that causes the frequency switching circuit to output a pulse signal for turning on and off the switching element therefrom, in which the frequency switching circuit switches the frequency of the pulse signal to a higher frequency when the current flowing when the switching element is turned on is greater than the threshold value or equal to or greater than the threshold value".

Patent Literature

Patent Literature 1: Japanese Patent Application Laid-Open No. 2010-74895

However, according to the technique described in Patent Literature 1, the oscillator that charges and discharges the capacitor using a current source is used, the hardware configuration is complicated, and thus there is a problem in that costs increase.

SUMMARY

The present invention is made in consideration of the above-mentioned circumstances and an object of the present invention is to provide a power conversion device that can simply switch (increase or change) a switching frequency without increasing costs using general functions mounted on a general microcomputer which is generally used as a control unit for controlling a switching element of a power conversion device.

To solve the above described problem and achieve the object according to a power conversion device disposed between an AC power source and a load includes: a rectifier circuit unit that rectifies a voltage of the AC power source; a smoothing unit that smooths a DC voltage on the load side of the rectifier circuit unit; a short-circuiting unit that is disposed on the AC power source side of the smoothing unit and that short-circuits the AC power source; a reactor that is disposed on the AC power source side of the short-circuiting unit; at least one of a reactor current detecting unit that detects the current of the reactor and a bus voltage detecting unit that detects an output voltage of the smoothing unit; a counterflow preventing element that prevents a counterflow of the current from the smoothing unit to the AC power source; a switching control unit that generates a drive pulse from the output signal of the reactor current detecting unit or the bus voltage detecting unit and that outputs a control signal for turning on or off the short-circuiting unit using the drive pulse; and a switching frequency changing unit that is disposed between the switching control unit and the short-circuiting unit and that changes a frequency of the control signal using a logic operation.

According to the present invention, it is possible to provide a power conversion device that can simply switch (increase or change) a switching frequency without increasing costs using general functions mounted on a general microcomputer which is generally used as a control unit for controlling a switching element of a power conversion device.

DETAILED DESCRIPTION

Hereinafter, power conversion devices according to embodiments of the present invention will be described in detail with reference to the accompanying drawings. The present invention is not limited to the embodiments.

First Embodiment

Figure 1:
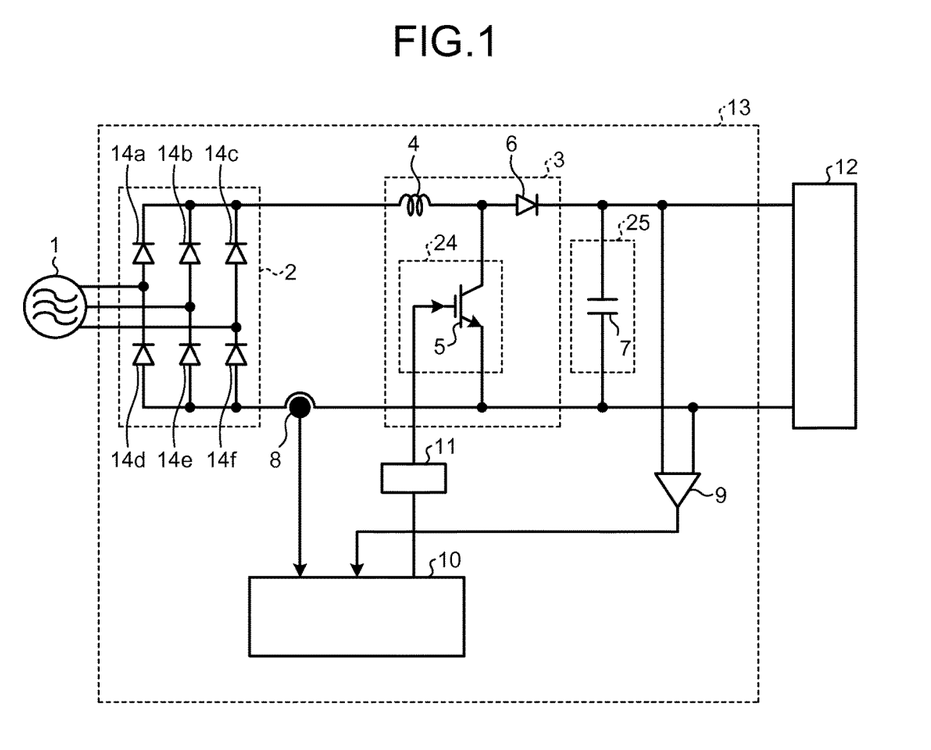
FIG. 1 is a diagram illustrating a configuration example of a power conversion device according to a first embodiment.

FIG. 1 is a diagram illustrating a configuration example of a power conversion device according to an embodiment of the present invention. A power conversion device 13 illustrated in FIG. 1 is disposed between a three-phase AC power source 1 (AC power source) and a load 12 and includes a three-phase rectifier 2 (rectifier circuit unit), a step-up converter unit 3, a smoothing capacitor 7, a reactor current detecting unit 8, a bus voltage detecting unit 9, a switching control unit 10, and a switching frequency changing unit 11.

The three-phase AC power source 1 is short-circuited via the step-up reactor 4 by a short-circuiting unit 24.

The three-phase rectifier 2 has a configuration in which six diode elements 14a to 14f are bridge-connected and rectifies an AC voltage of the three-phase AC power source 1.

The step-up converter unit 3 includes a step-up reactor 4, a switching element 5, and a counterflow preventing element 6. A smoothing unit 25 is disposed on the load 12 side of the step-up converter unit 3. The smoothing unit 25 includes the smoothing capacitor 7 and the output of the step-up converter unit 3 (a DC voltage on the load 12 side) is smoothed by the smoothing capacitor 7.

In the configuration of the step-up converter unit 3 illustrated in FIG. 1, the step-up reactor 4 is disposed on the three-phase AC power source 1 side of the short-circuiting unit 24, and the counterflow preventing element 6 is disposed on the load 12 side of the short-circuiting unit 24 so as to prevent a counterflow of a current from the smoothing unit 25 to the three-phase AC power source 1.

The short-circuiting unit 24 is disposed on the three-phase AC power source 1 side of the smoothing unit 25 and short-circuits the three-phase AC power source 1 side. The short-circuiting unit 24 includes the switching element 5 and the turning-on and turning-off of the short-circuiting unit 24 is controlled by the switching element 5. For example, an insulated gate bipolar transistor (IGBT) can be used as the switching element 5.

The counterflow preventing element 6 prevents a counterflow of a current from the smoothing unit 25 to the three-phase AC power source 1. As illustrated in FIG. 1, a diode element may be used as the counterflow preventing element 6. A fast recovery diode can be exemplified as the diode element to be used as the counterflow preventing element 6.

The smoothing capacitor 7 smooths the output of the step-up converter unit 3.

The reactor current detecting unit 8 detects a reactor current flowing in the step-up reactor 4.

The bus voltage detecting unit 9 detects a bus voltage which is the smoothed output voltage of the step-up converter unit 3 and outputs the detected bus voltage.

The switching control unit 10 generates a drive signal for operating the switching element 5, controls the turning-on and turning-off of the switching element 5, and controls the turning-on and turning-off of the short-circuiting unit 24. The switching control unit 10 only has to be configured by a computing unit. A microcomputer or a digital signal processor (DSP) can be exemplified as the computing unit.

Figure 2:
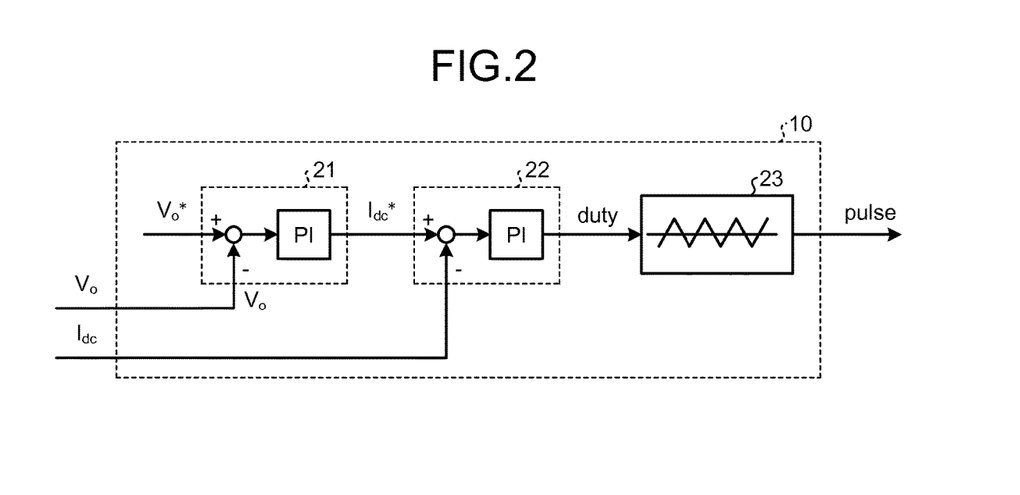
FIG. 2 is a diagram illustrating a switching control unit according to the first embodiment.

FIG. 2 is a diagram illustrating a configuration example of the switching control unit 10 according to the first embodiment of the present invention. The switching control unit 10 illustrated in FIG. 2 includes a bus voltage control unit 21, a reactor current control unit 22, and a drive pulse generating unit 23.

The bus voltage control unit 21 computes a reactor current command value $I_{dc}^*$ from a bus voltage value $V_o$ which is the output signal of the bus voltage detecting unit 9 and a bus voltage command value $V_o^*$. Here, the computing of the reactor current command value $I_{dc}^*$ is performed, for example, by performing proportional-integral control (PI control) on a deviation between the bus voltage value $V_o$ which is the output signal of the bus voltage detecting unit 9 and the bus voltage command value $V_o^*$.

The reactor current control unit 22 computes an ON-duty of the switching element 5 from a reactor current value $I_{dc}$ which is the output signal of the reactor current detecting unit 8 and the reactor current command value $I_{dc}^*$ which is the output signal of the bus voltage control unit 21. Here, the computing of the ON-duty is performed, for example, by performing proportional-integral control on a deviation between the reactor current value $I_{dc}$ which is the output signal of the reactor current detecting unit 8 and the reactor current command value $I_{dc}^*$ which is the output signal of the bus voltage control unit 21. The computing of the ON-duty may be performed by performing proportional-integral control (PI control) on the deviation between the bus voltage value $V_o$ which is the output signal of the bus voltage detecting unit 9 and the bus voltage command value $V_o^*$. That is, the ON-duty may also be computed without using the reactor current value $I_{dc}$. Accordingly, only any one of the reactor current detecting unit 8 and the bus voltage detecting unit 9 may be provided for computing the ON-duty.

The drive pulse generating unit 23 generates a drive pulse for operating the switching element 5 based on the ON-duty computed by the reactor current control unit 22 or the bus voltage control unit 21. The drive pulse generating unit 23 computes a timer value, for example, based on the ON-duty, compares the timer value with a carrier signal such as a triangular wave or a saw-toothed wave, and outputs a pulse signal such that the switching element 5 is turned on only in a section in which the timer value is greater than the carrier signal.

The computing method of the bus voltage control unit 21 and the reactor current control unit 22 is not limited to the proportional-integral control (PI control), and proportional control may be used or integral control may be used. Alternatively, proportional-integral-derivative control (PID control) may be used.

The operation of the step-up converter unit 3 will be described below. The input voltage of the step-up converter unit 3 is an output voltage rectified by the three-phase rectifier 2 and is denoted by $V_{ds}$. The output voltage of the step-up converter unit 3 is smoothed by the smoothing unit 25. The voltage smoothed by the smoothing unit 25 is denoted by $V_o$. When the switching element 5 is turned on, the counterflow preventing element 6 is not electrically connected and $V_{ds}$ is applied to both ends of the step-up reactor 4.

When the switching element 5 is turned off, the counterflow preventing element 6 is electrically connected and a voltage $V_{ds}-V_o$ is induced in the step-up reactor 4 in the reverse direction of that when the switching element 5 is turned on.

At this time, from the viewpoint of energy, energy is accumulated in the step-up reactor 4 when the switching element 5 is turned on, and the accumulated energy is transmitted to the load 12 when the switching element 5 is turned off.

When it is assumed that the energy input to and output from the step-up reactor 4 is constant when the switching element 5 is turned on and off, $V_{ds}$ and $V_o$ are expressed by $V_o=V_{ds}/(1-D_{on})$ using the ON-duty $D_{on}$.

Therefore, since $V_{ds}$ can be controlled by controlling the ON-duty $D_{on}$ of the switching element 5, it is possible to control the output voltage of the step-up converter unit 3.

When the above-mentioned equation is solved with respect to the ON-duty $D_{on}$, $D_{on}=(V_o-V_{ds})/V_o$ is obtained.

Therefore, a theoretical value of the ON-duty for obtaining a desired bus voltage is obtained by substituting the desired bus voltage command value $V_o^*$ for $V_o$ of the equation.

Figure 3:
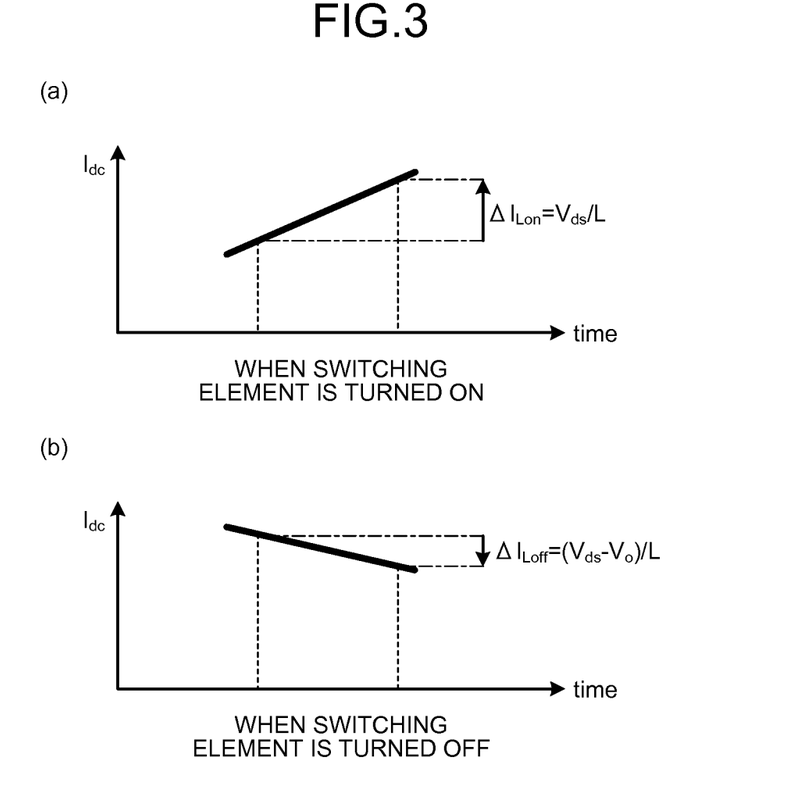
FIG. 3 is a diagram illustrating a current waveform when a step-up converter unit according to the first embodiment operates.

FIG. 3 is a diagram illustrating a current waveform when the step-up converter unit 3 is in operation. FIG. 3(a) illustrates a current waveform when the switching element 5 is turned on and FIG. 3(b) illustrates a current waveform when the switching element 5 is turned off. When the switching element 5 is turned on, $V_{ds}$ is applied to the step-up reactor 4. At this time, a reactor current $I_{Lon}$ flowing in the step-up reactor 4 from the three-phase AC power source 1 to the load 12 linearly increases with the lapse of time. The slope $\Delta I_{Lon}$ thereof is expressed by $\Delta I_{Lon}=V_{ds}/L$, where L is the inductance value of the step-up reactor 4.

When the switching element 5 is turned off, $V_{ds}-V_o$ is applied to the step-up reactor 4 in the reverse direction of that when the switching element is turned on. At this time, a current $I_{Loff}$ flowing in the step-up reactor 4 from the three-phase AC power source 1 to the load 12 linearly decreases and the slope $\Delta I_{Loff}$ thereof is expressed by $\Delta I_{Loff}=(V_{ds}-V_o)/L$.

From these equations, when the bus voltage command value $V_o^*$, the rectified voltage $V_{cs}$, and the ON-duty $D_{on}$ satisfy the relationships of the above-mentioned equation, a variation in current in a period in which the switching element 5 is turned on is equal to a variation in current in a period in which the switching element is turned off.

When the ON-duty $D_{on}$ is greater than that in the relationships of the above-mentioned equation, the variation in current in the period in which the switching element 5 is turned on is greater than the variation in current in the period in which the switching element is turned off.

Figure 4:
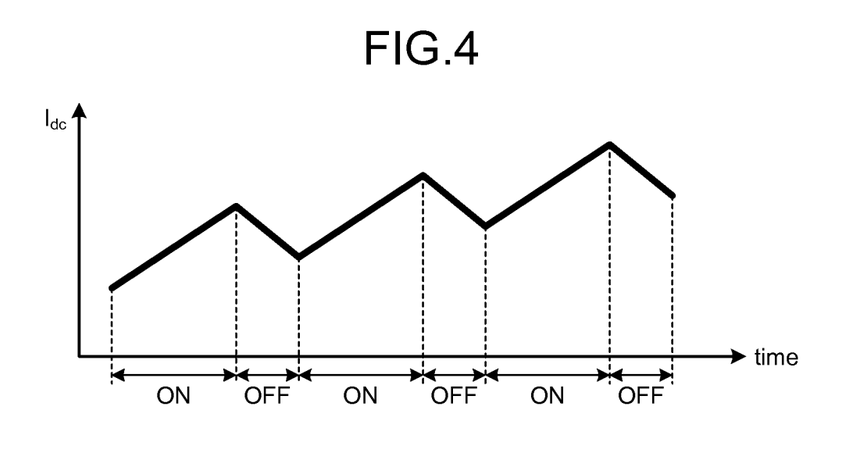
FIG. 4 is a diagram illustrating a current waveform when a variation in current in a period in which a switching element according to the first embodiment is turned on is greater than a variation in current in a period in which the switching element is turned off.

FIG. 4 is a diagram illustrating a current waveform when the variation in current in the period in which the switching element 5 is turned on is greater than the variation in current in the period in which the switching element is turned off. As illustrated in FIG. 4, the current gradually increases by repeatedly turning on and off the switching element 5.

When the ON-duty $D_{on}$ is smaller than that in the relationships of the above-mentioned equation, the variation in current in the period in which the switching element 5 is turned on is smaller than the variation in current in the period in which the switching element is turned off.

Figure 5:
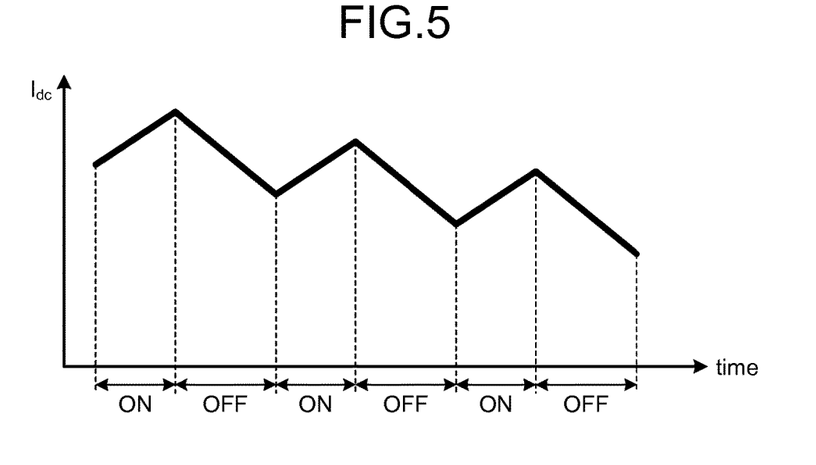
FIG. 5 is a diagram illustrating a current waveform when the variation in current in a period in which a switching element according to the first embodiment is turned on is smaller than the variation in current in a period in which the switching element is turned off.

FIG. 5 is a diagram illustrating a current waveform when the variation in current in the period in which the switching element 5 is turned on is smaller than the variation in current in the period in which the switching element is turned off. As illustrated in FIG. 5, the current gradually decreases by repeatedly turning on and off the switching element 5.

As described above with reference to FIGS. 4 and 5, the waveform of the current flowing in the step-up reactor 4 from the three-phase AC power source 1 to the load 12 can be controlled using the ON-duty.

Figure 6:
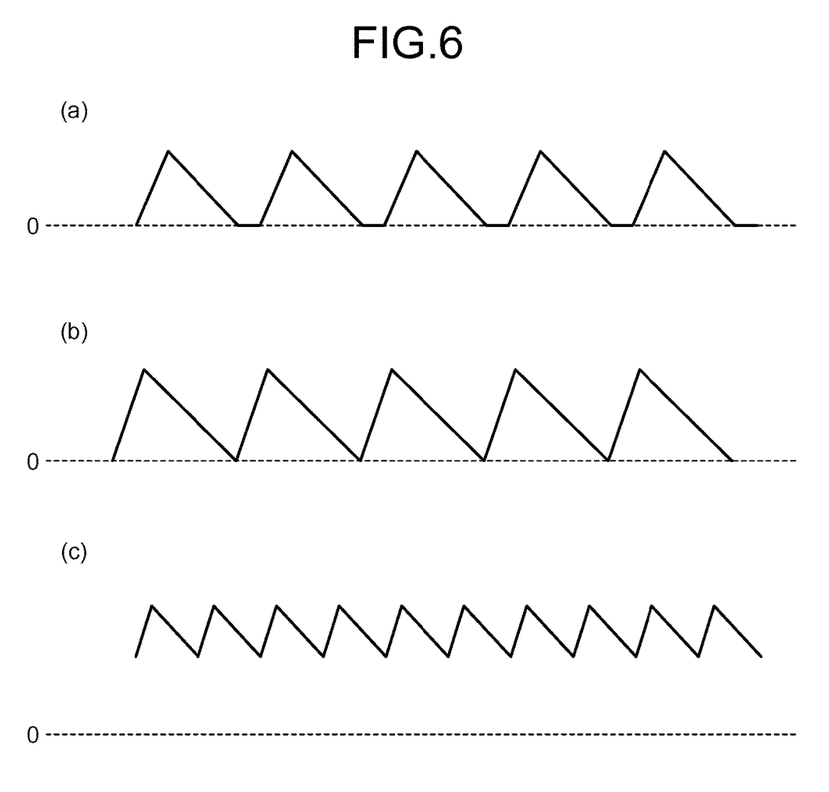
FIG. 6 is a diagram explaining current modes of a reactor current according to the first embodiment.

Current modes of the reactor current will be described below. FIGS. 6(a) to 6(c) are diagrams explaining the current modes of the reactor current.

As illustrated in FIG. 6(a), a current mode in which the reactor current becomes zero whenever the switching element 5 is switched (turned on and turned off) once is referred to as a discontinuous mode.

Meanwhile as illustrated in FIG. 6(c), a current mode in which the reactor current does not become zero whenever the switching element 5 is switched (turned on and turned off) once is referred to as a continuous mode. In the continuous mode, when the switching element 5 is turned on in the next time, behavior having the final value of the current in a section in which the switching element 5 is turned off in the previous time as an initial value is obtained.

As illustrated in FIG. 6(b), a current mode in which the reactor current becomes zero in a section in which the switching element 5 is turned off and a next section in which the switching element 5 is turned on is started is referred to as a critical mode because the current mode is a boundary between the discontinuous mode and the continuous mode.

As illustrated in FIG. 1, when the three-phase AC power source 1 is used and the AC voltage is rectified by the three-phase rectifier 2, input currents of respective phases have an electrified section of 120 degrees among 180 degrees of a source voltage period.

The current in the electrified section is equal to the current flowing in the step-up reactor 4 from the three-phase AC power source 1 side to the load 12 side in the electrified section.

Therefore, when the ON-duty is controlled and changed as described above, the waveform of the current flowing in the step-up reactor 4 is changed and the waveforms of the input currents of the phases are changed at this time. In this way, it is possible to step up the bus voltage using the step-up converter unit 3 and to achieve improvement in a power factor and a decrease in harmonic components included in the input currents.

Figure 7:
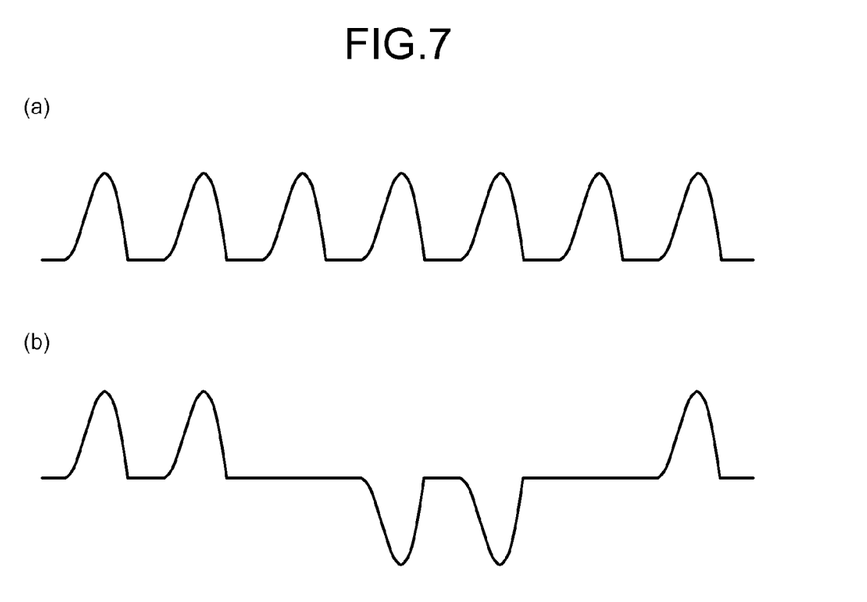
FIG. 7 is a diagram illustrating waveforms in a discontinuous mode according to the first embodiment.

FIGS. 7(a) and 7(b) illustrate waveforms in the discontinuous mode. FIG. 7(a) illustrates a waveform when the ON-duty is great in the discontinuous mode, and FIG. 7(b) illustrates a waveform when the ON-duty is small in the discontinuous mode.

Figure 8:
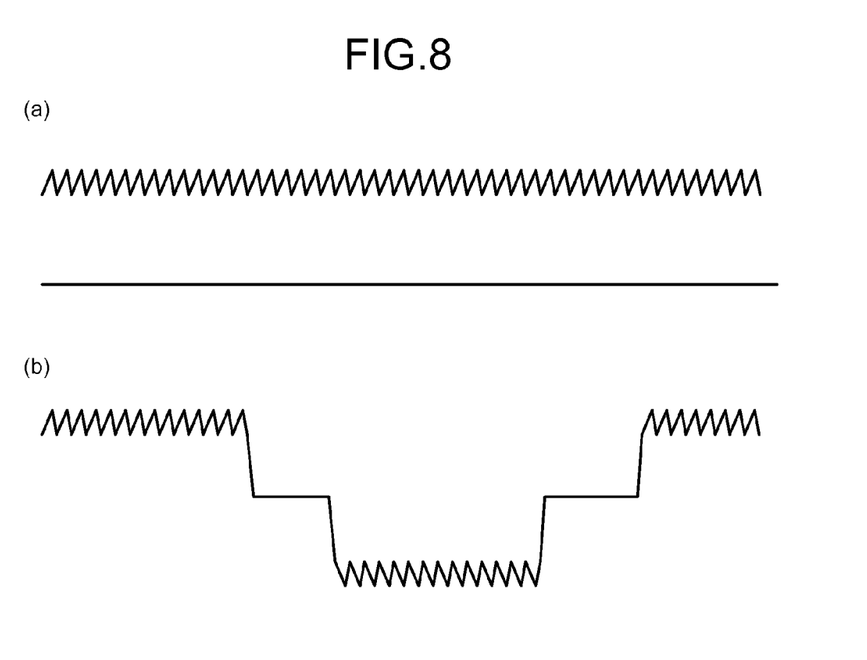
FIG. 8 is a diagram illustrating waveforms in a continuous mode according to the first embodiment.

FIGS. 8(a) and 8(b) illustrate waveforms in the continuous mode. FIG. 8(a) illustrates a waveform when the ON-duty is great in the continuous mode, and FIG. 8(b) illustrates a waveform when the ON-duty is small in the continuous mode.

As described above, the switching control unit 10 computes the ON-duty and turns on or off the switching element 5 based on the ON-duty, but the switching frequency which is a frequency at which the switching element 5 is repeatedly turned on and off is generally determined depending on the frequency of a carrier signal in the drive pulse generating unit 23. The carrier signal is set by the microcomputer or the like used in the switching control unit 10. However, since the timings at which the bus voltage control unit 21 and the reactor current control unit 22 perform the control operation and the like are synchronized with the timings of the peak and valley of the carrier signal, the carrier signal is generally set to a predetermined value. When the frequency of the carrier signal is high (the cycle is short), the time which can be used for the control operation is short. That is, there is a problem in that it is difficult to change the switching frequency (particularly, raise the frequency) depending on a load of a device.

Therefore, in the present invention, by disposing the switching frequency changing unit 11 between the gate of the switching element 5 included in the short-circuiting unit 24 and the switching control unit 10 as illustrated in FIG. 1, the switching frequency is changed without changing the frequency of the carrier signal in the drive pulse generating unit 23. In this way, since the frequency of the carrier signal in the drive pulse generating unit 23 is not changed, it is possible to change the switching frequency without affecting the load of the control operation.

Figure 9:
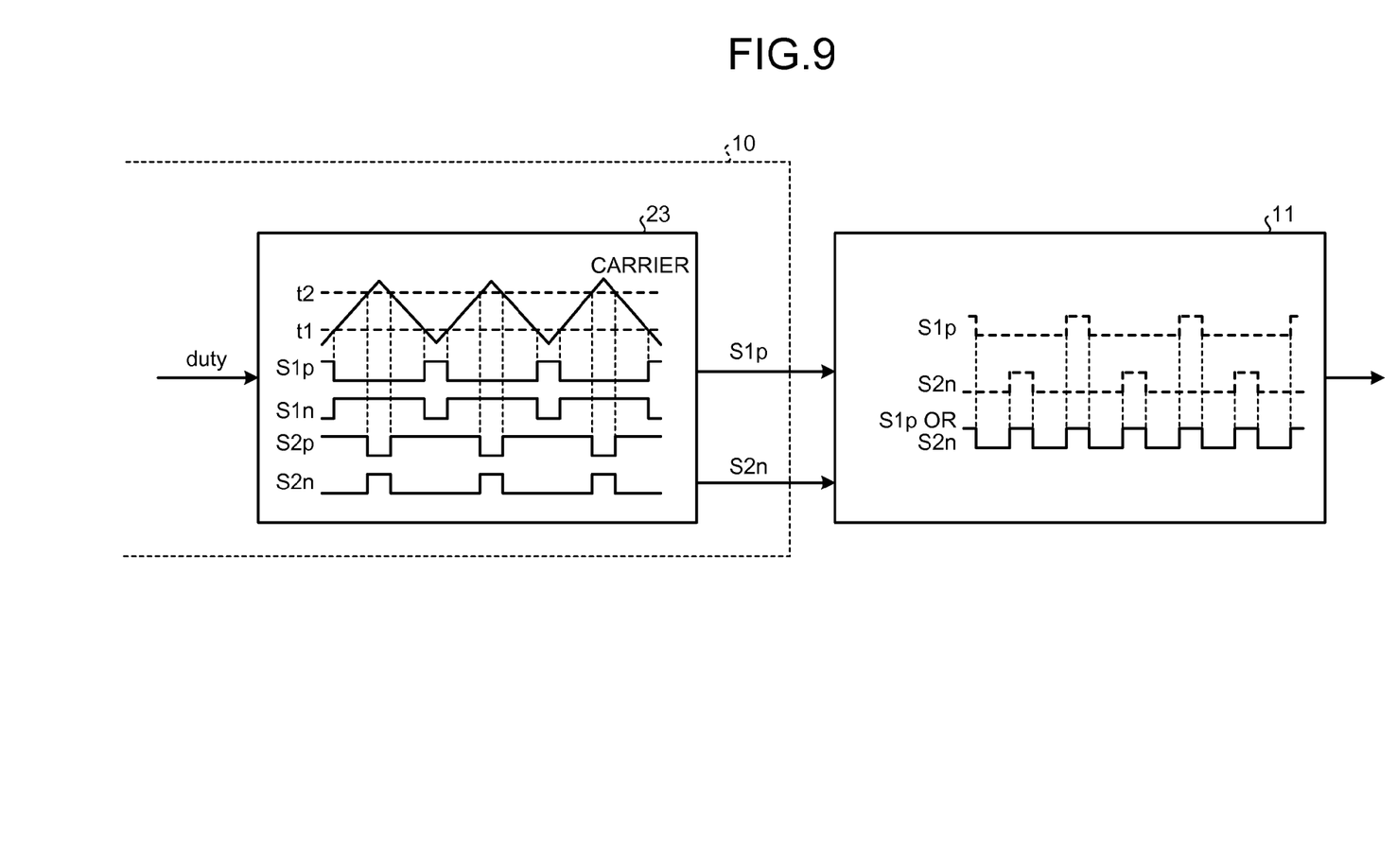
FIG. 9 is a diagram explaining a case in which a switching frequency is set to two times a frequency of a carrier signal in a drive pulse generating unit using a switching frequency changing unit.

The operation of the switching frequency changing unit 11 will be described below. FIG. 9 is a diagram explaining a case in which the switching frequency is set to two times the frequency of the carrier signal in the drive pulse generating unit 23 as an example of the operation of the switching frequency changing unit 11.

At this time, the drive pulse generating unit 23 outputs at least two drive pulses (S1 and S2). The drive pulse generating unit 23 preferably has a six-phase PWM function which is mounted on a microcomputer having a motor control function.

The six-phase PWM function is a general-purpose function, and generates two-phase drive pulses (S1p and S1n, S2p and S2n) which are suitable for upper and lower switching elements of a single phase of an inverter, that is, in which ON and OFF are inverted, by setting a timer value of a single phase which is often mounted on a microcomputer assumed to be used in control of a three-phase inverter controlling a motor. In use for motor control, for example, by setting timer values of three phases different by 120 degrees, the switching of six upper and lower elements of three phases of the inverter can be controlled.

In the first embodiment, it is possible to simply change the switching frequency by generating and using the six-phase drive pulses.

At this time, the first timer value t1 and the second timer value t2 in generating two drive pulses are computed as $t1=D_{on}/2$ and $t2=1-t1=1-D_{on}/2$, respectively, based on the ON-duty $D_{on}$ computed by the reactor current control unit 22.

Here, since the switching frequency is changed to two times the frequency of the carrier signal, a pulse having a phase difference of 180 degrees from the pulse in t1 in comparison with the same carrier signal is generated by setting the first timer value t1, to be compared with the carrier signal, to ½ of the ON-duty $D_{on}$ and setting the second timer value t2 to a value obtained by subtracting the first timer value t1 from 1 (the ON-duty of 100%). Here, the ratios of the ON time are the same in both pulses.

S1p and S2n are input to an OR circuit included in the switching frequency changing unit 11 (S1p OR S2n).

Here, S1p is a pulse signal for an upper-arm element of the inverter among the pulse signals generated using the first timer value t1, and S1n is a pulse signal for a lower-arm element of the inverter among the pulse signals generated using the first timer value t1. S2p is a pulse signal for an upper-arm element of the inverter among the pulse signals generated using the second timer value t2, and S2n is a pulse signal for a lower-arm element of the inverter among the pulse signals generated using the second timer value t2.

As described above, since S1p and S2n have the same ON-time ratio and have a phase different from 180 degrees, the output pulse signal due to the output of the logical sum thereof is a signal having a frequency of two times the frequency of the carrier signal in which an ON section and an OFF section appear twice in one period of the carrier signal.

By setting the first timer value t1 to ½ of the desired ON-duty $D_{on}$, the ON-time ratio to a switching period is equal to the desired ON-duty $D_{on}$. In this way, a pulse signal of a switching frequency which is greater than the upper limit of the carrier frequency of the microcomputer can be generated.

When the switching element 5 and the counterflow preventing element 6 are formed of a wide-gap semiconductor (for example, SiC or GaN), the elements are generally used at a switching frequency higher than that of an element formed of Si. When the wide-gap semiconductor is used in this way, according to the present invention, it is possible to realize the switching frequency suitable for the elements without enhancing specifications of the microcomputer used for the switching control unit 10. That is, it is possible to realize the switching frequency suitable for elements formed of a wide-gap semiconductor without increasing costs thereof.

When the switching frequency is raised, a necessary inductance value of the reactor can be lowered and it is thus possible to decrease the size of the reactor. Since a reactor having a low inductance value can be used, it is possible to reduce costs.

Here, when $t1=D_{on}$ and $t2=0$ (or $t1=0$ and $t2=D_{on}$) is set, a signal having a desired ON-duty at the same frequency as the carrier signal can be obtained. That is, since the switching frequency changing unit 11 is provided, the switching frequency can be switched to one time and two times the frequency of the carrier signal by only changing (switching) the computing equation for the timer values.

In the related art, the switching frequency is set to be constant in the entire load zone and thus a reactor having excellent DC superimposition characteristics (in which the inductance value is not changed easily even when the current value increases) is required. However, according to the present invention, even when a reactor having bad DC superimposition characteristics (in which the inductance value decreases when the current value increases) is used, the switching frequency can be switched to two times for use. This switching can be performed at a timing at which the reactor current value is greater than a predetermined threshold value. In this way, a core material of the reactor can be replaced with a material having bad DC superimposition characteristics and it is thus possible to reduce costs. The same converter can be applied to a large-capacity device.

Figure 10:
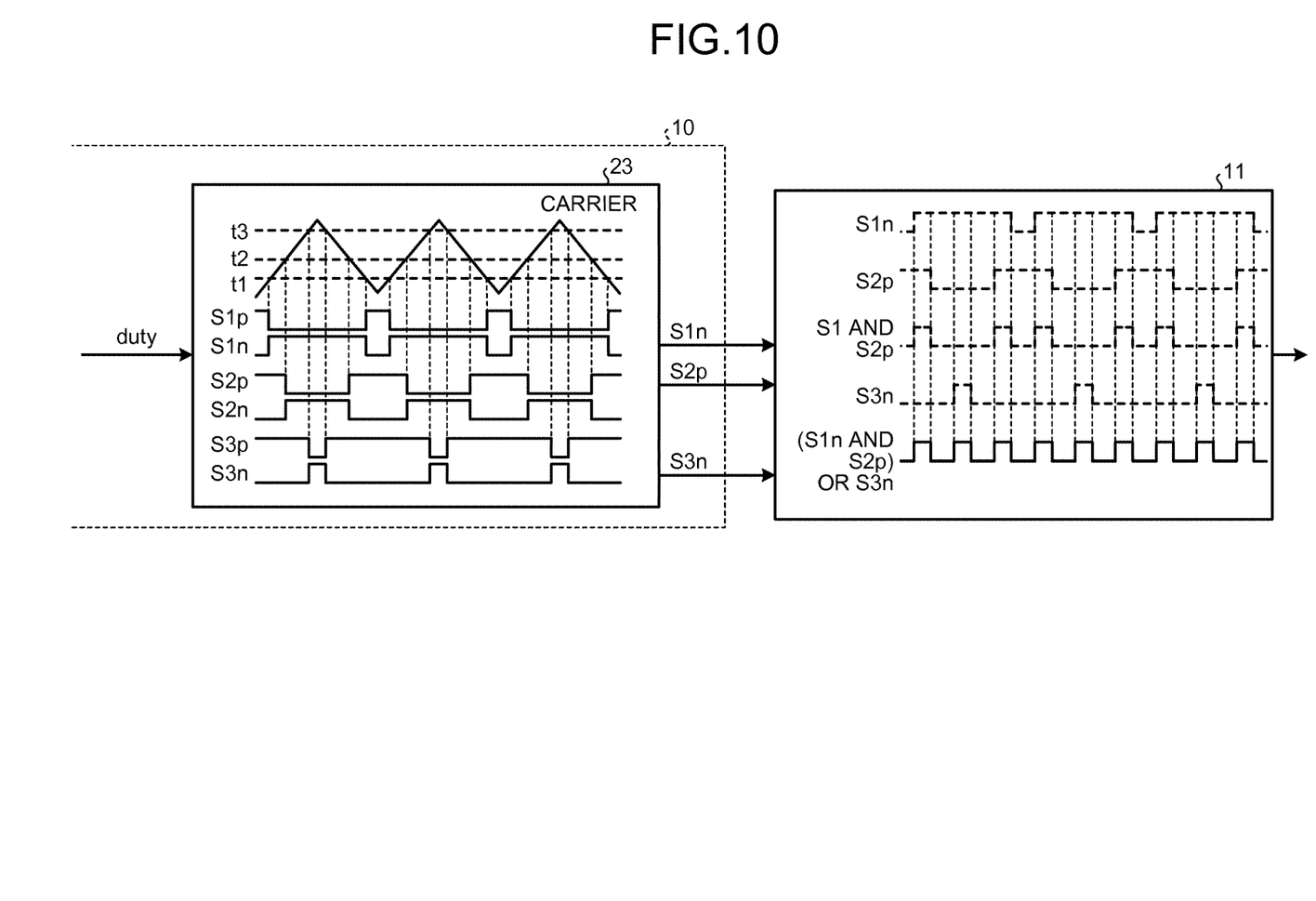
FIG. 10 is a diagram explaining a case in which the switching frequency is set to three times the frequency of the carrier signal in the drive pulse generating unit using the switching frequency changing unit.

FIG. 10 is a diagram explaining a case in which the switching frequency is set to three times the frequency of the carrier signal in the drive pulse generating unit 23 as an example of the operation of the switching frequency changing unit 11.

At this time, the drive pulse generating unit 23 outputs at least three drive pulses (S1, S2, and S3). At this time, the first timer value t1, the second timer value t2, and the third timer value t3 in generating three drive pulses are computed as $t1=(1-D_{on})/3$, $t2=(1+D_{on})/3$, and $t3=1-D_{on}/3$, respectively, based on the ON-duty $D_{on}$ computed by the reactor current control unit 22.

S1$n$, S2$p$, and S3$n$ are input to logic circuits (an AND circuit and an OR circuit) included in the switching frequency changing unit 11 ((S1$n$ AND S2$p$) OR S3$n$).

Here, S1$p$, S1$n$, S2$p$, and S2$n$ are the same as illustrated in FIG. 9. S3$p$ is a pulse signal for an upper-arm element of the inverter among the pulse signals generated using the third timer value t3, and S3$n$ is a pulse signal for a lower-arm element of the inverter among the pulse signals generated using the third timer value t3.

As described above, when the timer values computed using the desired ON-duty $D_{on}$ are set, the ON-time ratio to a switching period is equal to the desired ON-duty. In this way, a pulse signal of a switching frequency which is greater than the upper limit of the carrier frequency of the microcomputer can be generated.

When the switching element 5 and the counterflow preventing element 6 are formed of a wide-gap semiconductor (for example, SiC or GaN), the elements are generally used at a switching frequency higher than that of an element formed of Si. When the wide-gap semiconductor is used in this way, according to the present invention, it is possible to realize the switching frequency suitable for the elements without enhancing specifications of the microcomputer used for the switching control unit 10. That is, it is possible to realize the switching frequency suitable for elements formed of a wide-gap semiconductor without increasing costs thereof.

When the switching frequency is raised, a necessary inductance value of the reactor can be lowered and it is thus possible to decrease the size of the reactor and to reduce costs.

Here, when t1=0, t2=1, and $t3=1-D_{on}$ is set, a signal having a desired ON-duty at the same frequency as the carrier signal can be obtained without changing the logical operation unit. Alternatively, when t1=0, $t2=D_{on}/2$, and $t3=1-D_{on}/2$ is set, a signal having a desired ON-duty at a two times the frequency of the carrier signal can be obtained without changing the logical operation unit. That is, since the switching frequency changing unit 11 is provided, the switching frequency can be switched to one time, two times, and three times the frequency of the carrier signal by only changing (switching) the computing equation for the timer values.

In the related art, the switching frequency is set to be constant in the entire load zone and thus a reactor having excellent DC superimposition characteristics (in which the inductance value is not changed easily even when the current value increases) is required. However, according to the present invention, even when a reactor having bad DC superimposition characteristics (in which the inductance value decreases when the current value increases) is used, the switching frequency can be switched to two times or three times for use. This switching can be performed at a timing at which the reactor current value is greater than a predetermined threshold value. In this way, a core material of the reactor can be replaced with a material having bad DC superimposition characteristics and it is thus possible to reduce costs. The same converter can be applied to a large-capacity device.

The logic circuit used in the first embodiment may be constructed using only the same type of logic circuits (for example, only a NOR circuit or a NAND circuit). When the same type of logic circuits are used, a logic circuit having plural identical operators in the same package can be used and it is thus possible to suppress an increase in occupied area and cost of the logic circuit.

The logic circuit used in the first embodiment may be used as a protection circuit that cuts off a switching circuit. For example, by employing a configuration in which the switching signal can be cut off when an abnormal signal of a circuit is detected, it is possible to protect the circuit in abnormality.

The method of computing the ON-duty $D_{on}$ of the switching element 5 is not limited to performing of both the bus voltage control and the reactor current control as described above. Only one control may be performed or an open-loop control in which the bus voltage and the reactor current are not fed back may be performed.

In the first embodiment, a case in which a signal of a twice frequency is output using two signals output from the switching control unit and a signal of a three-times frequency is output using three signals output from the switching control unit is described above, but the present invention is not limited to this case. By properly combining the logic circuits, a signal of a desired frequency higher than the frequency of an input signal can be output.

Second Embodiment

The power conversion device according to the present invention is not limited to the power conversion device according to the first embodiment. FIGS. 11 to 14 are diagrams illustrating a configuration example of a power conversion device according to the second embodiment.

In the second embodiment, the elements having the same configurations as in the first embodiment will be referenced by the same reference signs. In the following description, a part not illustrated in the drawings has the same configuration as illustrated in FIG.

Figure 11:
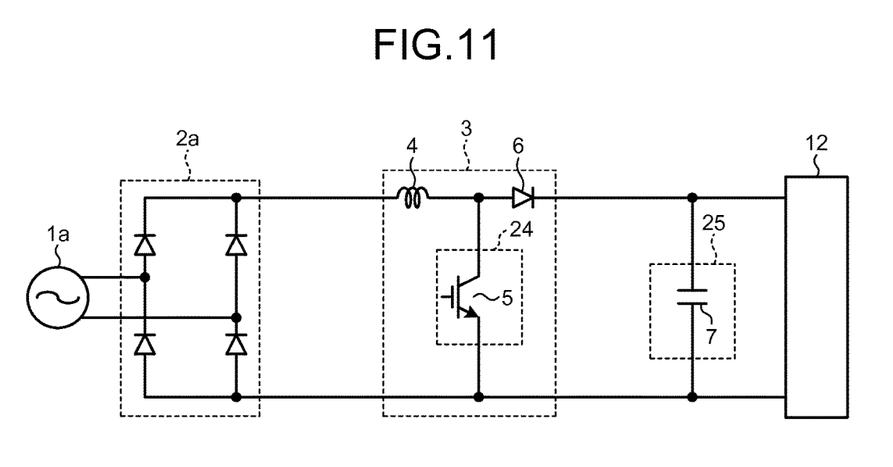
FIG. 11 is a diagram illustrating a configuration example of a power conversion device according to a second embodiment.

FIG. 11 illustrates a power conversion device in which the three-phase AC power source 1 is replaced with a single-phase AC power source 1a. As illustrated in FIG. 11, the present invention may be applied to the single-phase AC power source.

Figure 12:
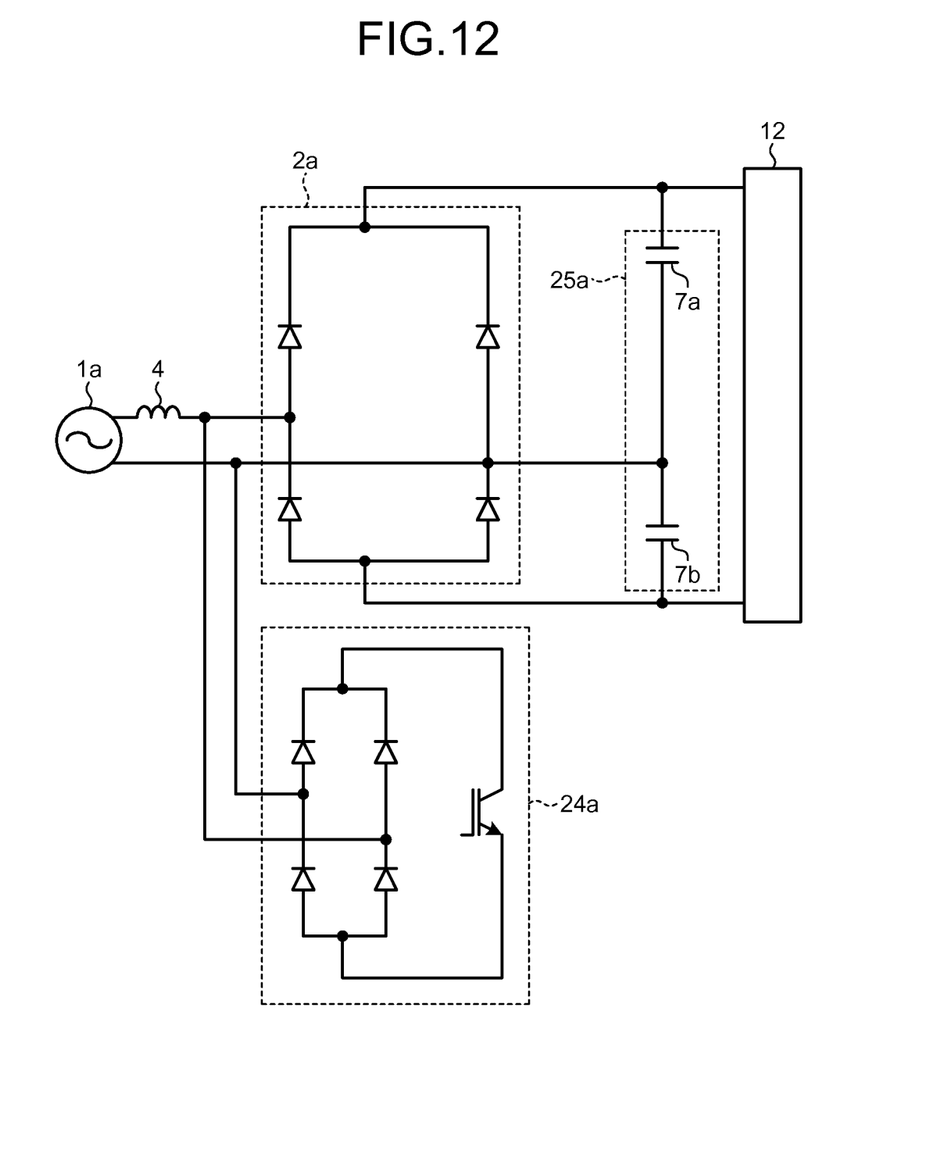
FIG. 12 is a diagram illustrating a configuration example of the power conversion device according to the second embodiment.

FIG. 12 is a diagram illustrating a power conversion device in which the three-phase AC power source 1 is replaced with a single-phase AC power source 1a and which includes a short-circuiting unit 24a as a bidirectional switch short-circuiting the single-phase AC power source 1a via a step-up reactor 4, a smoothing unit 25a including two smoothing capacitors 7a and 7b connected in series to each other, and a single-phase rectifier 2a.

The short-circuiting unit 24a illustrated in FIG. 12 includes a short-circuiting rectifier circuit unit in which four diode elements are bridge-connected and a short-circuiting switch. When the AC power source is short-circuited as illustrated in FIG. 12, the direction of the current flowing in the short-circuiting unit 24a varies depending on the phases.

In FIG. 12, the short-circuiting of the power source via the step-up reactor 4 is repeated by turning on and off the short-circuiting unit 24a and the input current from the single-phase AC power source 1a is shaped.

The smoothing unit 25 illustrated in FIG. 12 includes two smoothing capacitors 7a and 7b. When the terminal connected to the step-up reactor 4 has a higher potential and the short-circuiting switch is turned off, the capacitor of the smoothing capacitor 7a is charged. When the terminal connected to the step-up reactor 4 has a lower potential, the smoothing capacitor 7b is charged and the voltage applied to the load 12 is two times the voltage in full-wave rectification. When the short-circuiting switch disposed in the short-circuiting unit 24a is turned on, a current flows in the short-circuiting unit 24a.

FIG. 12 illustrates a general configuration, for example, when a single insulated gate bipolar transistor (IGBT) is used as the short-circuiting switch.

Figure 13:
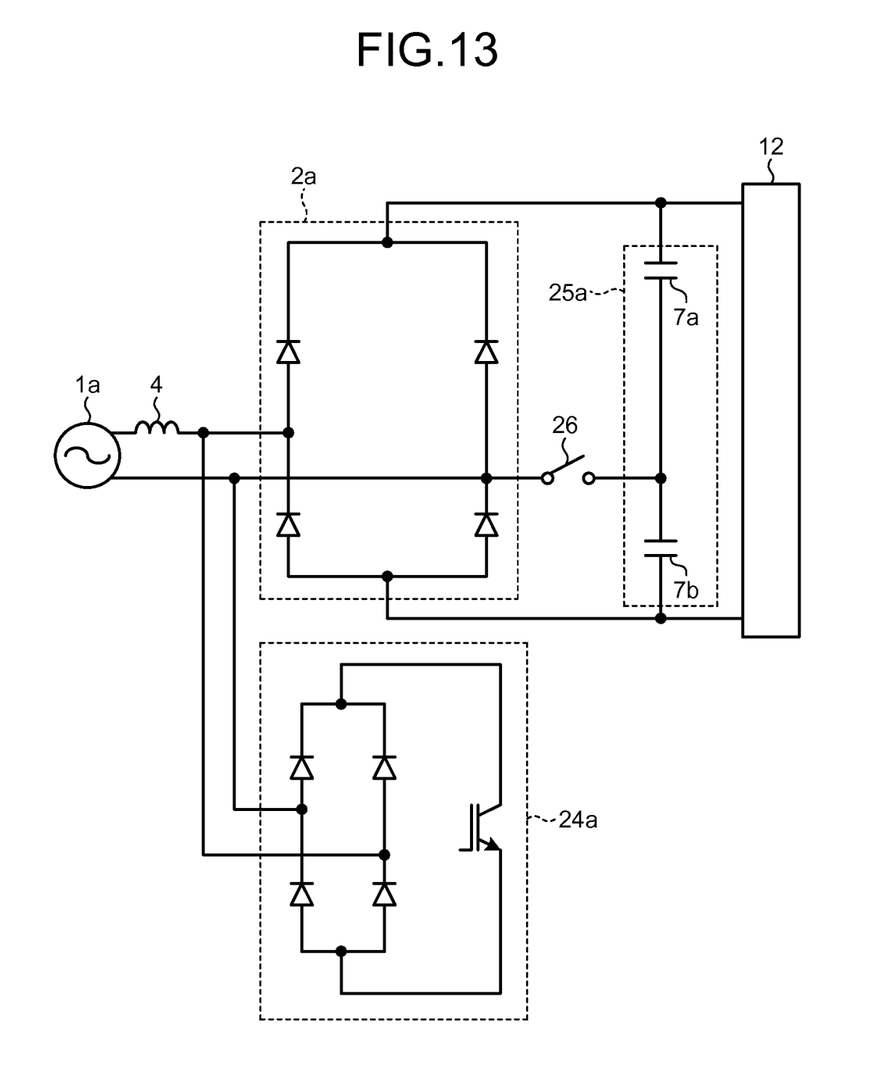
FIG. 13 is a diagram illustrating a configuration example of the power conversion device according to the second embodiment.

FIG. 13 is a diagram illustrating a power conversion device in which a switch 26 is added to the configuration illustrated in FIG. 12. A part at which the diode elements are connected in series in the single-phase rectifier 2a illustrated in FIG. 13 and a part at which two smoothing capacitors 7a and 7b are connected are connected to each other via the switch 26. By employing the configuration illustrated in FIG. 13, the smoothing capacitors 7a and 7b can be alternately charged and a two-times rectified voltage can be obtained, whereby the rectified voltage can be switched to one time and two times.

Figure 14:
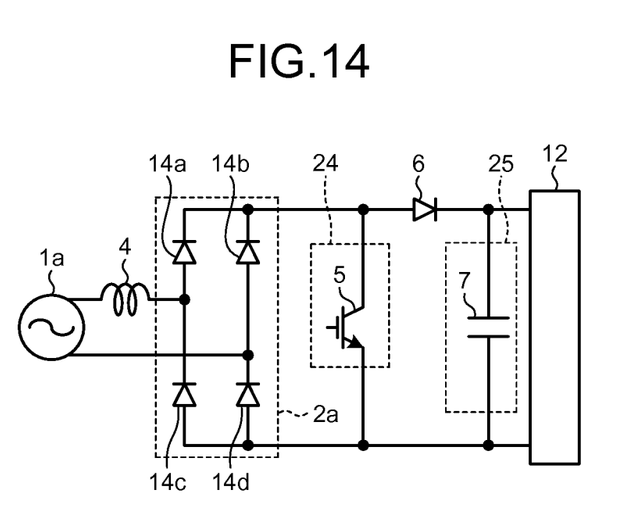
FIG. 14 is a diagram illustrating a configuration example of the power conversion device according to the second embodiment.

FIG. 14 is a diagram illustrating a power conversion device in which a step-up reactor 4 is disposed between the single-phase AC power source 1a and the single-phase rectifier 2a in the configuration illustrated in FIG. 11. The present invention can be applied to the configuration illustrated in FIG. 14.

The invention claimed is:

1. A power conversion device disposed between an AC power source and a load, comprising:
   a rectifier circuit unit that rectifies a voltage of the AC power source;
   a smoothing unit that smooths a DC voltage on the load side of the rectifier circuit unit;
   a short-circuiting unit that is disposed on the AC power source side of the smoothing unit and that has a switching element to short-circuit the AC power source in response to a drive signal;
   a reactor that is disposed on the AC power source side of the short-circuiting unit;
   at least one of a reactor current detecting unit that detects the current of the reactor and a bus voltage detecting unit that detects an output voltage of the smoothing unit;
   a counterflow preventing element that prevents a counterflow of the current from the smoothing unit to the AC power source;
   a switching control unit that generates a carrier signal, computes timer values, generates a plurality of drive pulses different from the carrier signal by making the output signal of the reactor current detecting unit or the bus voltage detecting unit as an input, the plurality of drive pulses each having a frequency in accordance with a frequency of the carrier signal based on each of the timer values and having phases in which ON and OFF are inverted, and outputs the plurality of drive pulses; and
   a switching frequency changing unit that is disposed between the switching control unit and the short-circuiting unit and that receives input drive pulses each selectively having either one of the phases among the plurality of drive pulses, performs a logic operation on the input pulses to form an output signal, and outputs the output signal as the drive signal to the switching element, the output signal having a frequency that is different from the frequency of the carrier signal and in accordance with the input drive pulses and the timer values.

2. The power conversion device according to claim 1, wherein the frequency of the output signal of the switching frequency changing unit is higher than the frequency of the carrier signal.

3. The power conversion device according to claim 1, wherein two drive pulses having two phases are input to the switching frequency changing unit, and
   wherein the frequency of the output signal of the switching frequency changing unit is approximately two times the frequency of the carrier signal.

4. The power conversion device according to claim 1, wherein three drive pulses having three phases are input to the switching frequency changing unit, and
   wherein the frequency of the output signal of the switching frequency changing unit is higher than the frequency of the carrier signal.

5. The power conversion device according to claim 1, wherein three drive pulses having three phases are input to the switching frequency changing unit, and
   wherein the frequency of the output signal of the switching frequency changing unit is approximately three times the frequency of the carrier signal.

6. The power conversion device according to claim 1, wherein a wide-gap semiconductor is used for at least any one of the short-circuiting unit and the counterflow preventing element.

7. The power conversion device according to claim 1, wherein the reactor current detecting unit and the bus voltage detecting unit is controlled in response to the carrier signal.

8. The power conversion device according to claim 1, wherein
   the switching control unit includes a drive pulse generating unit, and
   the drive pulse generating unit is configured to
      compute a timer value in accordance with an ON-duty based on a bus voltage value which is an output signal of the bus voltage detecting unit and a reactor current value which is an output signal of the reactor current detecting unit,
      compare the timer value with the carrier signal, and
      output a plurality of pairs of signals as the pulse signal.

9. The power conversion device according to claim 1, wherein the switching frequency changing unit is electrically connected between the switching element of the short-circuiting unit and the switching control unit.

* * * * *